United States Patent [19]

Curran

[11] Patent Number: 5,267,748
[45] Date of Patent: Dec. 7, 1993

[54] VEHICLE TOOL PLATFORM APPARATUS AND METHOD

[76] Inventor: Charles F. Curran, 76 Westfield St., Dedham, Mass. 02026

[21] Appl. No.: 935,003

[22] Filed: Aug. 25, 1992

[51] Int. Cl.⁵ ............................................. B60R 11/06
[52] U.S. Cl. ..................... 280/415.1; 280/769; 224/42.03 R; 224/42.07
[58] Field of Search ............... 224/42.03 R, 42.06, 224/42.07, 42.08; 248/286, 287; 280/415.1, 504, 769

[56] References Cited

U.S. PATENT DOCUMENTS

| | | |
|---|---|---|
| 1,515,915 | 11/1924 | Valenta . |
| 1,529,251 | 3/1925 | Hansen . |
| 4,378,107 | 3/1983 | Wagster . |
| 4,516,308 | 5/1985 | Urban .................... 296/24.1 X |
| 4,576,395 | 3/1986 | Longoria ..................... 280/511 |
| 4,906,015 | 3/1990 | Lacroix . |
| 4,949,945 | 8/1990 | Whiteley . |
| 5,038,983 | 8/1991 | Tomososki . |
| 5,082,037 | 1/1992 | Hammons et al. ............ 248/287 X |
| 5,106,002 | 4/1992 | Smith et al. ................. 224/42.03 R |

FOREIGN PATENT DOCUMENTS 3904682 8/1990 Fed. Rep. of Germany ...... 280/504

OTHER PUBLICATIONS

Wheeless Trailer 1990 Carefree of Colorado Scott Fetzer Company.

Primary Examiner—Margaret A. Focarino
Assistant Examiner—Victor E. Johnson
Attorney, Agent, or Firm—Richard P. Crowley

[57] ABSTRACT

A vehicle tool platform apparatus adapted for use with and attachment to a work type truck having a rear tailgate or a van with rear doors, said truck or van having a rear trailer hitch. A vehicle tool platform apparatus comprising a flat tool platform, elongated angle support bar having one end secured to the bottom surface of the tool platform and the other end adapted to be received and secured in the rear trailer hitch. A work tool, such as a vise, bench grinder or saw, is secured to the top surface of the tool platform. The angle and length of the support rod is designed so that the plane of the tool platform is at a height generally level with the floor of the van or the bed of the truck to which the work platform apparatus is to be secured. Further, the platform is positioned a sufficient distance from the rear of the vehicle to which the work platform is to be secured to permit the doors of the vehicle to be opened fully, or the tailgate of the truck to be lowered to a plane level with and adjacent to the top surface of the work platform apparatus.

6 Claims, 2 Drawing Sheets

VEHICLE TOOL PLATFORM APPARATUS AND METHOD

BACKGROUND OF THE INVENTION

Automotive vehicles, such as vans or trucks, have often been employed for the commercial user to provide for the carrying and storage of tools and other implements utilized by the commercial user. Typically van type vehicles include a pair of rear opening doors which move from a closed position to an outwardly extending open position to permit access to the interior surface of the van. Trucks typically have a tailgate which may move between a closed position to define an interior space within the truck bed and an open position wherein the tailgate extends generally horizontally outward from the rear of the truck. Both vans and trucks often include a trailer hitch such as a releasable type trailer hitch to permit the van or truck to secure it to a trailer type vehicle, typically a work type vehicle associated with the commercial use. Normally such a trailer hitch is adapted and secured to the rear portion of the van or truck generally centrally located and below the bumper. Trailer hitches may vary such as a ball type hitch or hollow square steel tubing fixed in a position which forms a square external and internal cross section and is designed to coincide with the interior configuration of a receiver to be inserted therein and locked therein to prevent relative motion between the trailer hitch and the receiver. Commercial vans would include air conditioning vans, electrical vans, plumbing and heating vans, as well as full size, medium size pickup trucks which may contain storage areas therein and various tools and racks associated with such commercial use.

It is desirable to provide for a simple and effective work tool platform and method by which the work tool platform may be removably secured to the trailer hitch of a commercial vehicle and provide an additional work platform containing a work tool relating to the commercial use adjacent to the tailgate. In summary, the invention relates to a work tool platform to be employed with a commercial use type vehicle and a method of employing such a work platform.

SUMMARY OF THE INVENTION

The invention is directed to a vehicle work tool platform apparatus particularly for use in commercial vans or pickup trucks.

The tool platform apparatus of the invention comprises typically of metal plate having a top and bottom surface which is adapted to receive and secure a working tool into the top surface of the tool platform, and which includes a generally elongated angle support bar with one end secured such as welded to the bottom surface of the work tool platform and the other end adapted to be immovably secured to the trailer hitch of the vehicle with which the work tool is to be employed. The work tool apparatus of the invention also includes a work tool, removably secured to the top surface of the work tool platform and typically designed for use with the commercial use and nature of the vehicle with which it is to be employed, such as for example a vise that is a nonelectrical type of device which may operate separately, or an electrically operated device such as a bench grinder or saw, which may have an electrical connection running from the work tool to a separate source or to an electrical source in the vehicle.

The work tool apparatus of the invention includes a support bar of sufficient length and angle to provide that the plane of the top surface of the work tool platform is at a height generally level with the floor of the commercial van in which it is being employed, or the plane of the horizontally extended open tailgate of the truck in which the work platform is to be secured. Further, the tool platform is generally directly next to or adjacent to the top surface of the lowered tailgate, thereby permitting the tool platform to be effectively employed by the commercial user without hindrance. The support bar should have a length and angle, for example, of about 45° and be of sufficient length to provide for a difference in height of greater than 12", for example 12–18" than the trailer hitch so as to permit the plane of the work tool Platform to be level with the bed of the truck or the tailgate and to be at a sufficient horizontal distance and length for example extending from the end of the trailer of 36" or more to permit the tailgate to be lowered and the van doors to be opened. However the angle of the support bar and the height of the support bar and the length thereof may vary depending on the particular vehicle to which the work tool platform is to be secured.

The invention includes a method of providing a work tool platform with a work tool thereon to the rear of a commercial vehicle such as a truck or van, having a trailer hitch at the rear portion thereof which method comprises providing a tool platform as set forth and releasably securing the other end of the support bar into the trailer hitch of the vehicle and then employing the work tool on the tool platform with the tailgate of the truck or the door of the van in an open position.

The type of work tool to be employed in the top surface of the work tool platform may vary as desired and may include electrical or nonelectrical devices, typically with such devices bolted to the top surface through bolt holes or slots in the work platform so that they may be removed and other work devices substituted as the need arises.

The invention shall be described for the purposes of illustration only in connection with certain embodiments, however, it is recognized that various modifications, changes, improvements and additions can be made by those persons skilled in the art to the illustrated embodiment all falling within the spirit and scope of the invention.

A BRIEF DESCRIPTION OF THE DRAWINGS

DESCRIPTION OF THE EMBODIMENTS

Figure 1:
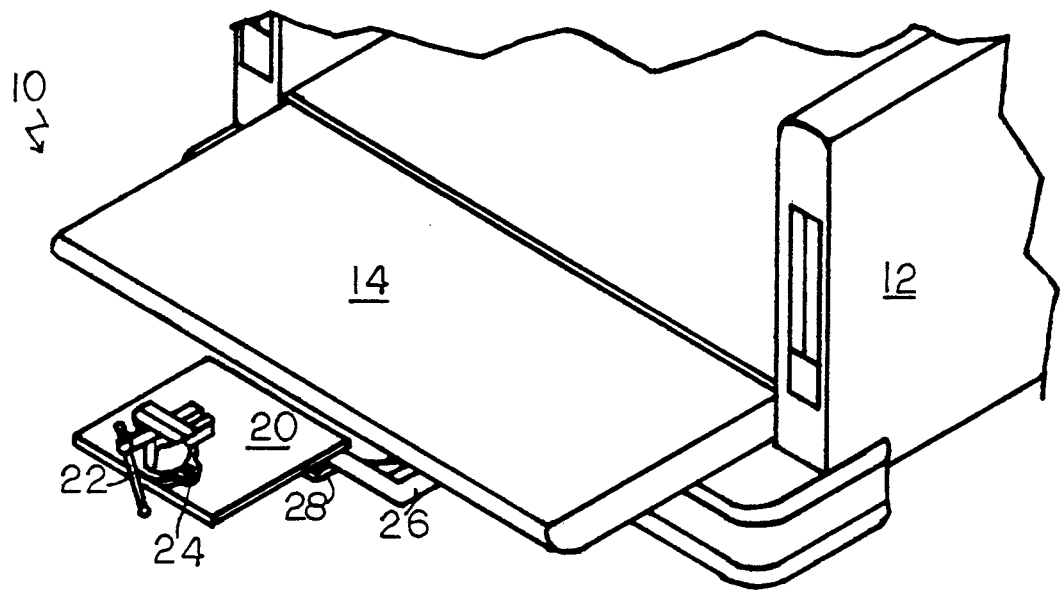
FIG. 1 is a perspective view from above of a vehicle with the work tool platform removably attached to the trailer hitch.
Figure 2:
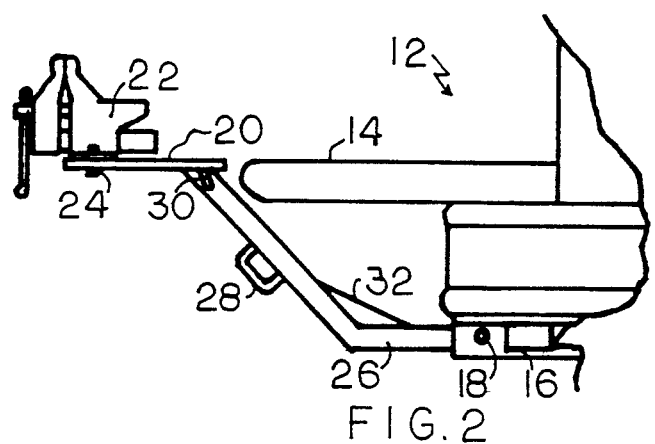
FIG. 2 is a side plan view of the work tool platform and vehicle of FIG. 1.
Figure 3:
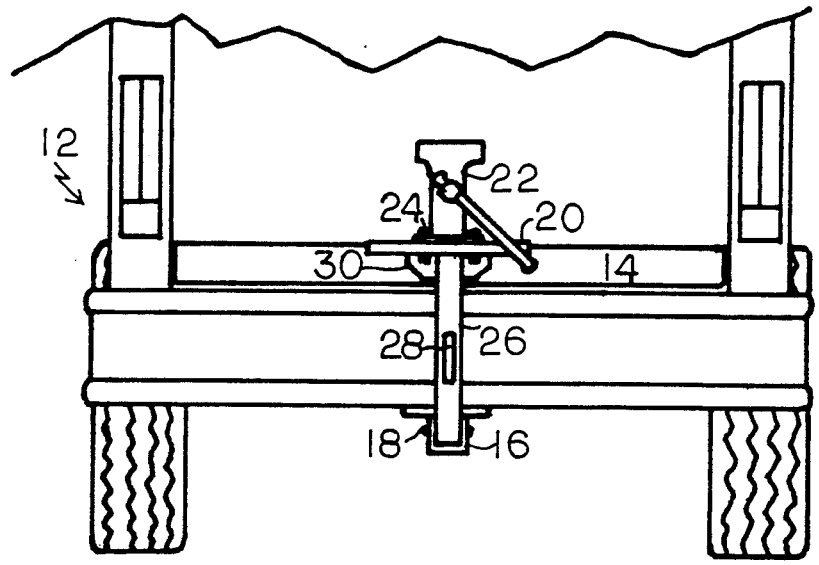
FIG. 3 is a back plan view of the work tool platform and vehicle of FIG. 1.

With reference to FIGS. 1, 2, and 3 there is shown the invention 10 which comprises in combination a pickup truck 12 having a tailgate 14 in a down open horizontally extended position. The pickup truck 12, has a Class 3 type of receivable trailer hitch 16 with a hitch pin 18.

The work tool apparatus comprises a flat metal platform 20, the plane of the platform generally in line with the plane of the lowered tailgate 14 and next to but slightly spaced apart therefrom in a position such that the tailgate may be lowered to the horizontal open position and closed without the work platform apparatus interfering with the movement. The horizontally extending tailgate platform 14 serves as an additional work surface for the commercial user. The tool apparatus platform 20 is just adjacent to the end of the horizontally extending tailgate 14 spaced apart for example from 3-12 inches.

As illustrated, the flat metal platform 20 has a vise 22 thereon which may also include any other small work type tool, and with the vise removably secured to the top surface of the platform 20 through a plurality of bolts 24 extending through bolt holes or slots in the flat platform 20. The work flat platform 20 is supported by an angular extending hollow type metal support arm 26 having one end and an other end and having a handle 28 beneath the work platform 20 to aid in the movement and installation of the work platform into the trailer hitch 16. The angular arm 26 is at a general angle of about 45° and includes an angular section and a straight section, the one end of the straight section adapted to be inserted and received within the Class 3 trailer hitch 16. The other end, at the arm 26, is welded to the undersurface of the platform 20 and with the platform 20 having additional support through a plurality of triangular-type wing metal supports 30 welded to the bottom of the platform and to the support arm 26. In addition, the support arm 26 contains a triangular support 32 at the intersection at the angle in straight sections of the arm 30 to provide additional support of the work platform. As illustrated, the work platform is generally in a position of 12-18 inches above the trailer hitch and aligned with the top surface of the plane of the tailgate 14.

Figure 4:
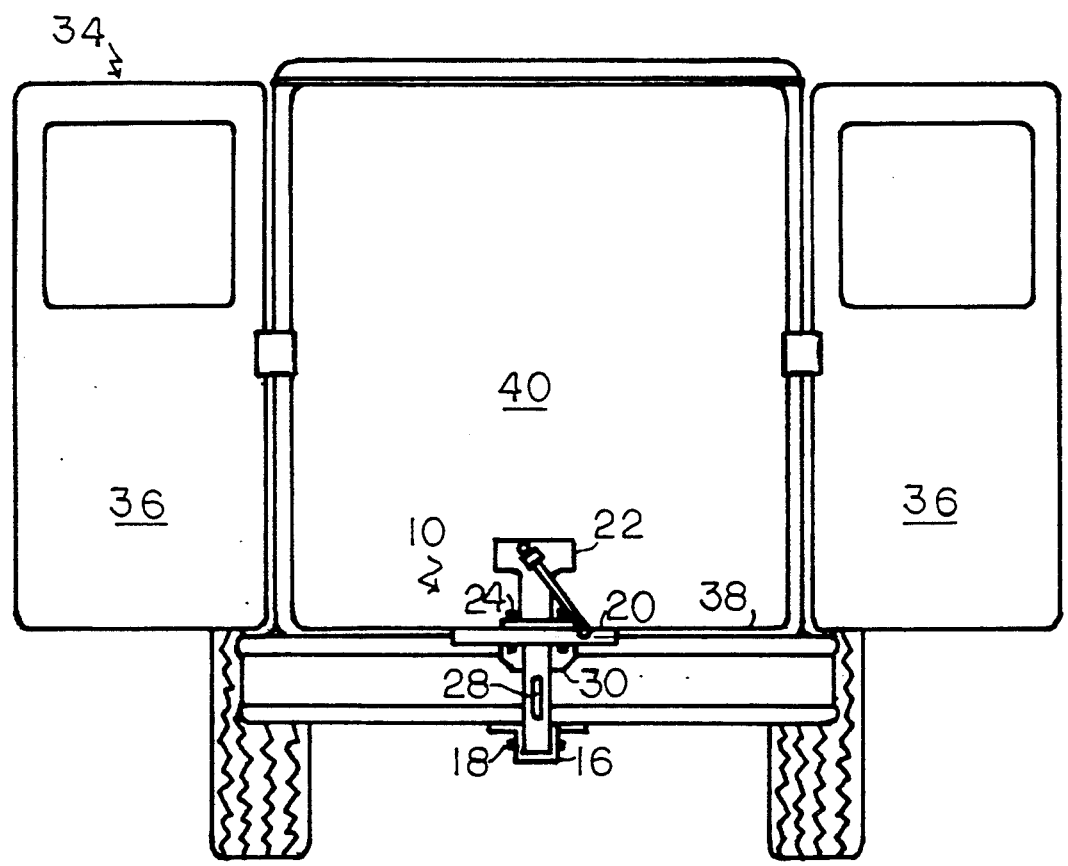
FIG. 4 is a back plan view of a commercial van with the work tool platform releasably secured to the trailer hitch thereto.

FIG. 4 is directed to the use of a commercial van 34 having a pair of doors 36 shown in the open position and with the van 34 having a van floor 38. The work platform is so designed that the angle of the arm and length of the support arm 26 is such that the work platform 20 with device 22 extends outwardly so that the vertical doors 36 of the van 34 may be opened without having the work platform 20 interfere with the operation of the van doors. In this embodiment the top surface of the platform 20 may be designed to be in a plane with the van floor 38 for ease in use by the commercial user.

The invention thus comprises a simple, effective vehicle tool platform apparatus and method for use with work-type trucks and commercial vans by an additional separate removably detachable work platform adapted to be removably secured to the rear trailer hitch of the commercial vehicle.

What is claimed is:

1. In combination, a system which includes a vehicle tool platform apparatus to support a tool and a vehicle to which the vehicle tool platform apparatus is releasably secured and which combination comprises:
   a) a pickup truck vehicle having a flat bed and a rear tailgate, which tailgate moves between an upright position and an open, generally horizontal extended position from the flat bed, and which vehicle includes a rear trailer hitch;
   b) a vehicle tool platform which comprises:
      i) a tool platform having a flat top surface and bottom surface;
      ii) an elongated angled support bar having a one and other end, one end secured to the bottom surface of the tool platform, the other end removably secured to the trailer hitch of the said vehicle;
      iii) a work tool removably secured to the top surface of the tool platform;
      iv) the angle and length of the support bar sufficient to provide for the top surface of the tool platform to be at a height generally level with and directly adjacent to the tailgate in the extended position; and
      v) the angle and length of the support bar sufficient to provide for the work platform to be at a sufficient distance to permit the tailgate of the vehicle to move without interference with the operation of the tailgate between the open and upright position.

2. The system of claim 1 wherein the elongated support bar comprises a hollow square bar adapted to fit within and be secured to a class 3 trailer hitch.

3. The system of claim 1 wherein the support bar comprises a short horizontal section extending from the bottom surface of the work platform and an angled section extending from the trailer hitch.

4. The system of claim 3 wherein the angled section has an angle of about 45 degrees and a height of about 12 to 24 inches from the trailer hitch system.

5. The system of claim 1 which includes a handle means attached to the support bar to aid in movement and placement of the tool apparatus.

6. The system of claim 1 which includes a plurality of spaced apart support wings secured to the bottom surface of the tool platform and to the support bar.

* * * * *